US008297842B2

(12) United States Patent
Xia

(10) Patent No.: US 8,297,842 B2
(45) Date of Patent: Oct. 30, 2012

(54) AIR GUIDE

(75) Inventor: Fa-Ping Xia, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 459 days.

(21) Appl. No.: 12/647,637

(22) Filed: Dec. 28, 2009

(65) Prior Publication Data
US 2010/0172702 A1 Jul. 8, 2010

(51) Int. Cl.
*F16C 32/06* (2006.01)

(52) U.S. Cl. ........... 384/12; 406/88; 406/192; 406/194; 33/712

(58) Field of Classification Search .............. 384/12; 33/712; 406/88, 192, 194
See application file for complete search history.

(56) References Cited

U.S. PATENT DOCUMENTS

| | | | | |
|---|---|---|---|---|
| 3,754,799 A * | 8/1973 | Hedberg | ............... | 384/12 |
| 3,903,993 A * | 9/1975 | Vorrhees et al. | ........... | 184/5 |
| 4,299,518 A * | 11/1981 | Whelan | ............... | 406/62 |
| 4,630,942 A * | 12/1986 | Tsumaki et al. | ............... | 384/8 |
| 4,974,970 A * | 12/1990 | Sugita et al. | ............... | 384/12 |
| 5,098,204 A * | 3/1992 | Blanz | ............... | 384/12 |
| 5,326,177 A * | 7/1994 | Ottone et al. | ............... | 384/12 |
| 5,518,360 A * | 5/1996 | Toda et al. | ............... | 414/755 |
| 5,562,396 A * | 10/1996 | Yamazaki et al. | ............... | 414/676 |
| 6,086,255 A * | 7/2000 | Lyon | ............... | 384/12 |
| 6,138,560 A * | 10/2000 | Chen | ............... | 101/123 |
| 6,491,435 B1 * | 12/2002 | Nishikawa et al. | ............... | 384/12 |
| 6,502,987 B2 * | 1/2003 | Kafai | ............... | 384/12 |
| 6,986,501 B2 * | 1/2006 | Sticht | ............... | 251/129.15 |
| 7,269,475 B1 * | 9/2007 | Hogg et al. | ............... | 700/229 |
| 7,275,870 B2 * | 10/2007 | Kawai et al. | ............... | 384/12 |
| 7,275,871 B2 * | 10/2007 | Kawai et al. | ............... | 384/12 |
| 7,311,036 B2 * | 12/2007 | Uchino | ............... | 92/165 R |
| 7,311,444 B2 * | 12/2007 | Wasson et al. | ............... | 384/12 |
| 7,347,649 B2 * | 3/2008 | Duerr et al. | ............... | 406/49 |
| 7,490,710 B1 * | 2/2009 | Weskamp et al. | ............... | 198/345.3 |
| 7,651,272 B2 * | 1/2010 | Kawai et al. | ............... | 384/12 |
| 7,785,009 B2 * | 8/2010 | Saito et al. | ............... | 384/12 |
| 2005/0129339 A1 * | 6/2005 | Sai et al. | ............... | 384/12 |
| 2006/0018571 A1 * | 1/2006 | Kawai et al. | ............... | 384/12 |
| 2006/0056747 A1 * | 3/2006 | Kawai et al. | ............... | 384/12 |
| 2006/0251346 A1 * | 11/2006 | Wasson et al. | ............... | 384/12 |
| 2006/0274980 A1 * | 12/2006 | Saito | ............... | 384/12 |
| 2007/0047854 A1 * | 3/2007 | Kawai et al. | ............... | 384/12 |
| 2007/0154120 A1 * | 7/2007 | Kawai et al. | ............... | 384/12 |
| 2007/0201775 A1 * | 8/2007 | Saito et al. | ............... | 384/12 |

(Continued)

FOREIGN PATENT DOCUMENTS

JP 6-50339 2/1994

(Continued)

*Primary Examiner* — Joseph A Dillon, Jr.
(74) *Attorney, Agent, or Firm* — Altis Law Group, Inc.

(57) ABSTRACT

An air guide includes a slide member and a guide track. The guide track defines a guide hole slidably receiving the slide member. The guide track defines an air intake in an outer surface, a plurality of air outlets in an inner surface opposite to the sliding member, and a plurality of guide holes therein. The guide holes communicates the air intake with the air outlets. The guide track further defines a plurality of guide grooves in the inner surface, communicating with the air outlets.

13 Claims, 4 Drawing Sheets

U.S. PATENT DOCUMENTS

2008/0053917 A1* 3/2008 Larson et al. .................. 210/741
2009/0297075 A1* 12/2009 Muneishi ........................ 384/12
2010/0092113 A1* 4/2010 Muneishi ........................ 384/12
2010/0098356 A1* 4/2010 Giacchi et al. .................. 384/12

FOREIGN PATENT DOCUMENTS

JP 6-193635 7/1994

* cited by examiner

AIR GUIDE

BACKGROUND

1. Technical Field

The present disclosure relates generally to optical systems and, more particularly, to an air guide for an optical system.

2. Description of Related Art

Air guides are widely used in precision measuring devices. The air guide generally has a tube track and a slide tube slidably received in the tube track. Friction between the tube track and the slide tube is low due to a gap therebetween full of air. The air guide generates little heat when the slide member slides in the track.

The tube track defines a plurality of air guide holes therein and an air intake at one end of each air guide hole exposed to the exterior, and an air outlet at the other end of each air guide hole communicating with the interior of the tube track. In use, air enters the air guide holes via the air intakes, and exhausted into the tube track via the air outlets. Air density of the portions adjacent to the air outlets is higher than in the other portions away from the air outlets. Therefore, the slide tube moves along in the tube track, and precision is affected. In addition, each air intake connects with a corresponding conduit, thereby increasing the size of the tube track.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
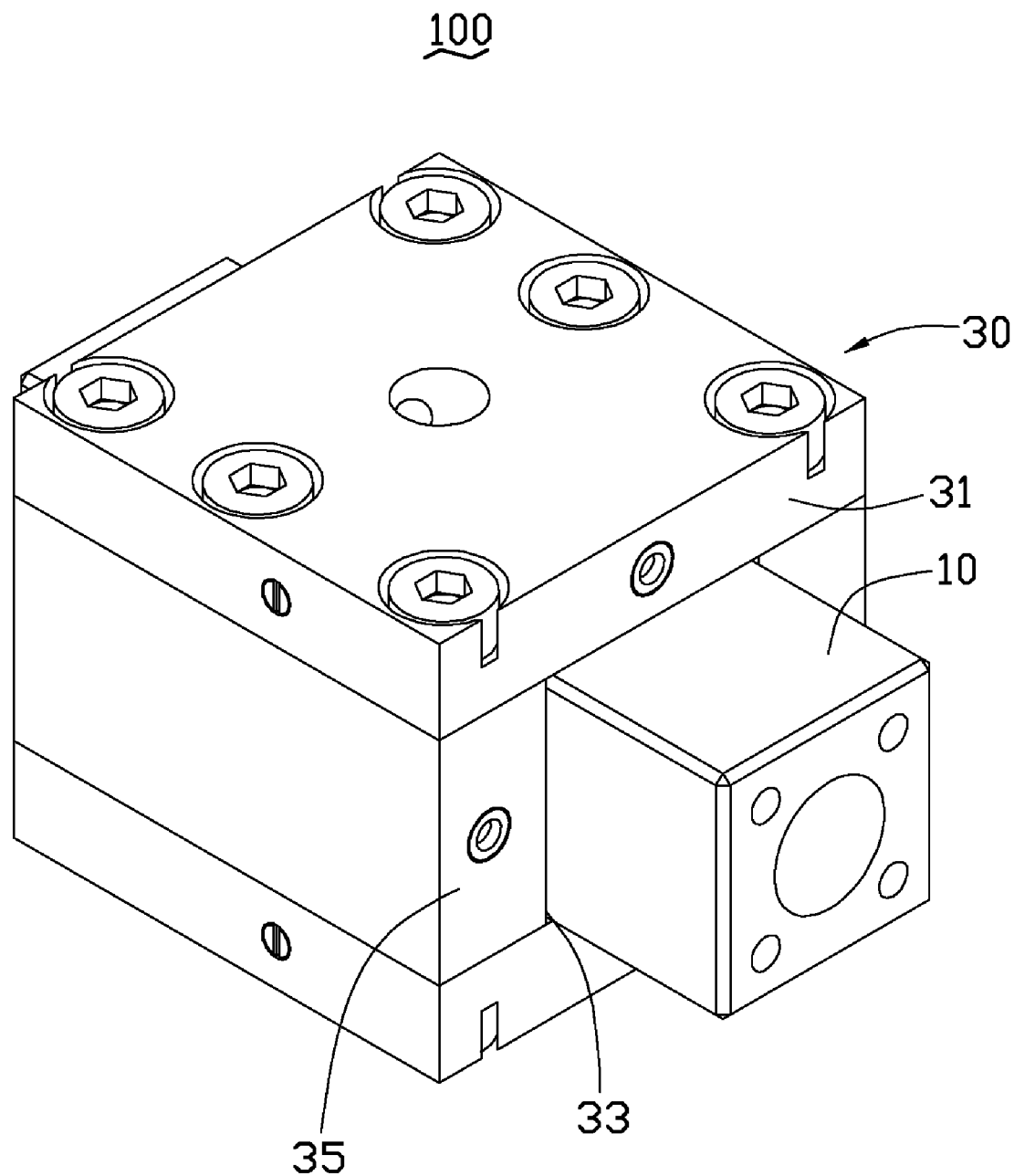
FIG. 1 is an isometric view of an embodiment of an air guide, including a slide member and a guide track.

Referring to FIG. 1, an embodiment of an air guide 100 includes a slide member 10 and a guide track 30 sleeved on the slide member 10. In the illustrated embodiment, the slide member 10 is of a hollow center, and has a substantially square cross-section.

Figure 2:
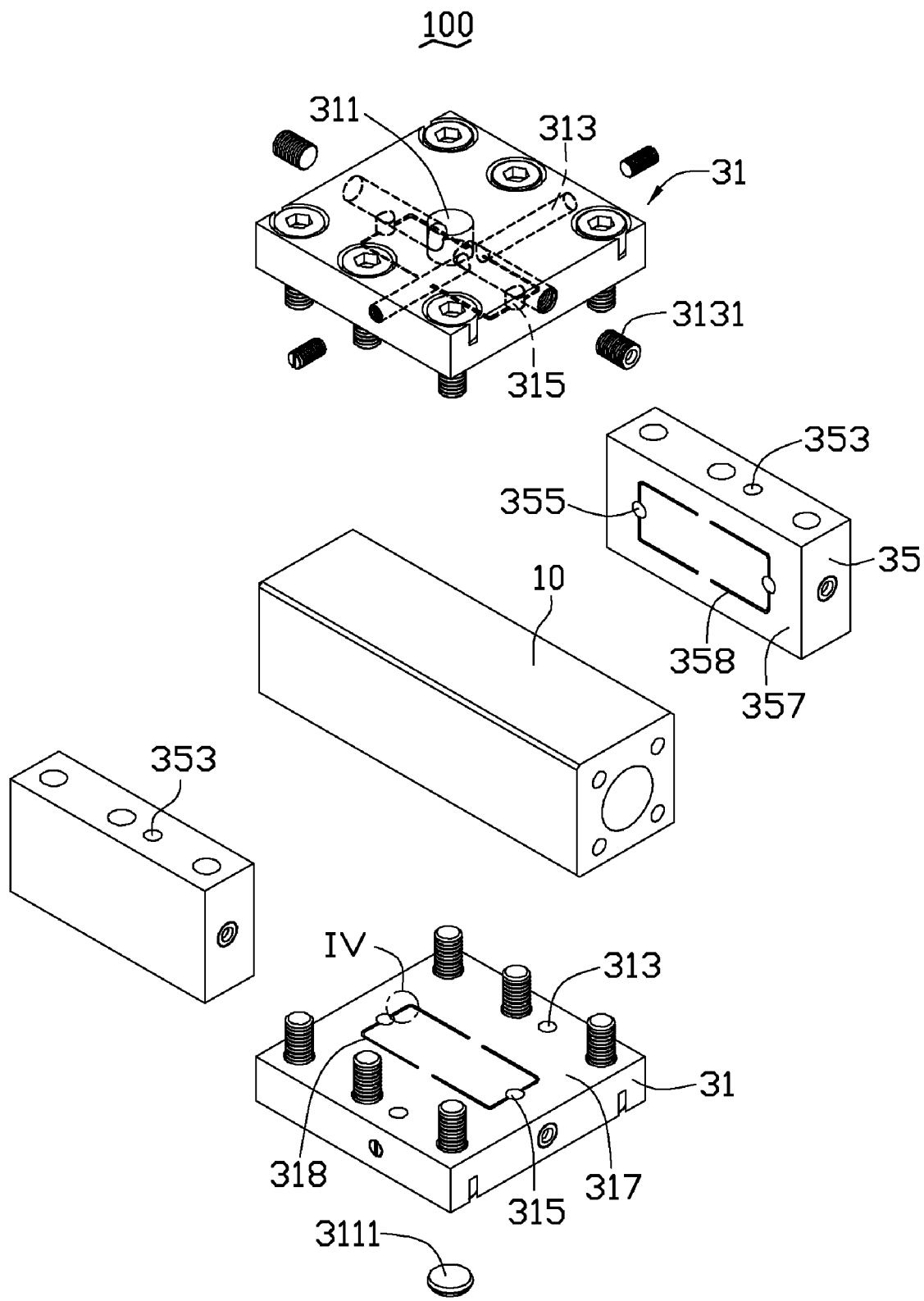
FIG. 2 is an exploded, isometric view of the air guide of FIG. 1.
Figure 3:
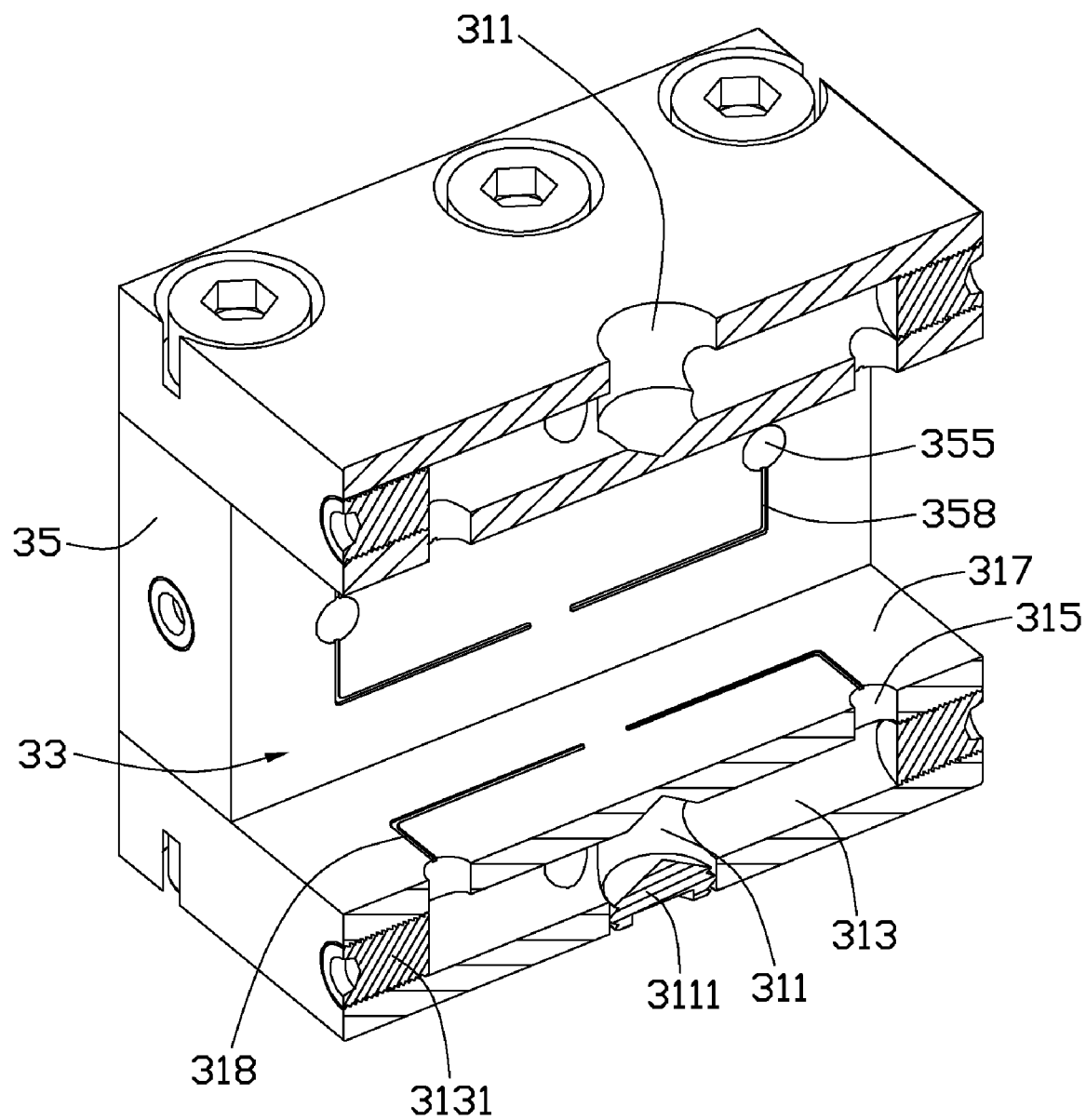
FIG. 3 is a side cross-section of the guide track of FIG. 2.

Referring to FIGS. 2 and 3, the guide track 30 includes two first side plates 31 and two second side plates 35. The first side plates 31 and the second side plates 35 cooperatively define a rectangular guide hole 33. The slide member 10 is slidably received in the guide hole 33 of the guide track 30. The first side plates 31 and the second side plates 35 can be fixed together via welding, gluing or fasteners such as bolts or socket screws. In the illustrated embodiment, the first side plates 31 and the second side plates 35 are fixed together via fasteners in the form of a plurality of hex socket screws (not labeled).

Figure 4:
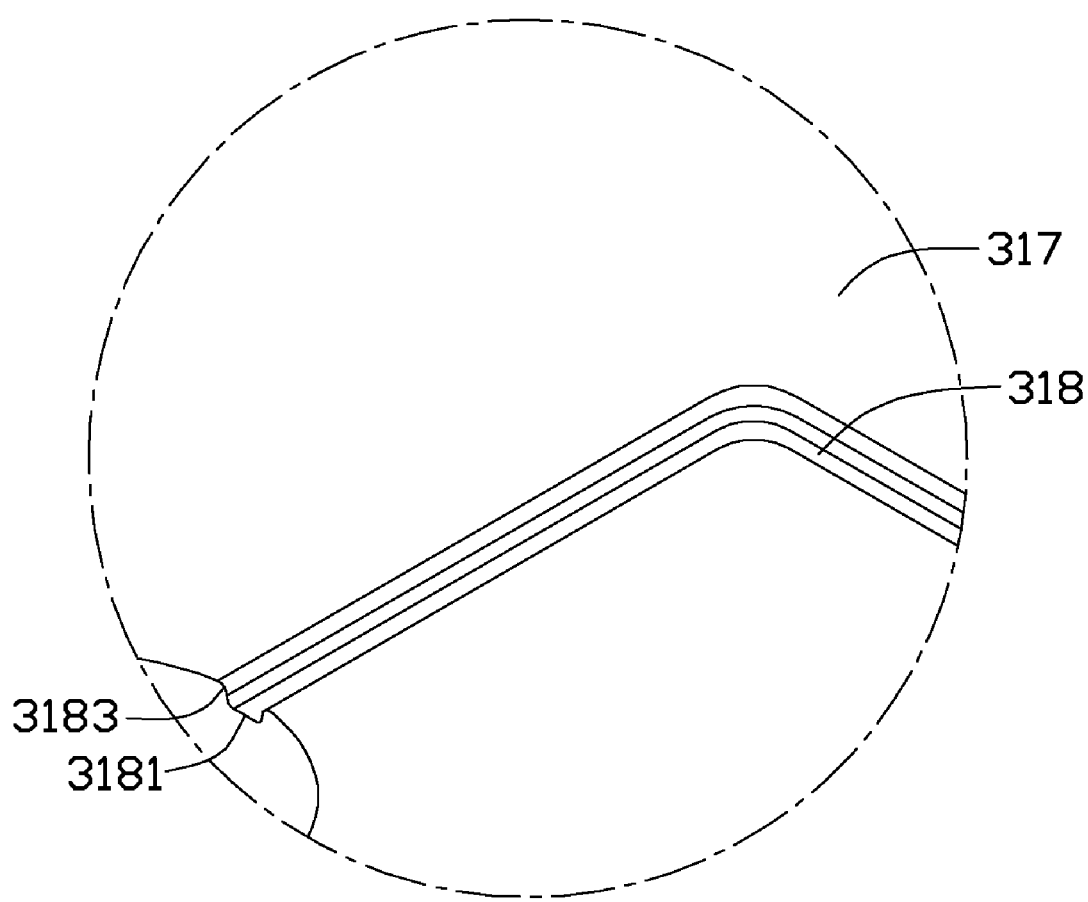
FIG. 4 is an enlarged view of a part IV of the FIG. 2.

Each first side plate 31 defines an air intake 311 in a center portion. The air intake 311 of one first side plate 31 is connected with an air conduit (not shown), and the air intake 311 of the other first side plate 31 is blocked/capped by a plug 3111. Each first side plate 31 further defines a plurality of air guide holes 313 communicating with the air intake 311, and a plurality of air outlets 315 communicating with the air guide holes 313. Each first side plate 31 defines an air guide groove 318 in an inner surface 317. The air guide groove 318 communicates with the air outlets 315. Each air guide groove 318 is defined by a bottom wall 3181 and two opposite sidewalls 3183. Each sidewall 3183 connects the bottom wall 3181 or the inner surface 317 via curved surface, enhancing airflow in the air guide groove 318 (as shown in FIG. 4). In the illustrated embodiment, the first side plate 31 defines four air guide holes 313 arranged on a periphery of the air intake 311, and two air outlets 315 in the inner surface 317. The air guide groove 318 is substantially L-shaped, and a corner of the air guide groove 318 is rounded (as shown in FIG. 4).

Each second side plate 35 has similar structure as the first side plate 31, except that the second side plate 35 does not define an air intake 311. The second side plate 35 defines a plurality of air guide holes 353 communicating with each other, a plurality of air outlets 355 in the inner surface 357 communicating with the air guide holes 353, and a plurality of air guide groove 358 in the inner surface 357 communicating with the air outlets 355.

When the first side plates 31 and the second side plates 35 are fixed together to form the guide hole 33 via the fasteners (socket screws with slotted or hex configuration), not labeled), the air guide holes 313 of the first side plate 31 communicate with the air guide holes 353 of the second side plate 35. Width of the air guide grooves 318, 358 exceeds or equals to a gap distance between the inner surface 317, which includes the air guide grooves 318, of the guide track 30 and the slide member 10. An end of each air guide holes 313 exposed to the exterior is blocked/capped by a sealing member 3131. In the illustrated embodiment, the sealing members 3131 are fasteners such as hex socket screw.

In use, the compressed air is pumped into the air intake 311 via the conduit, and flows to the first side plates 31 and the second side plates 35 via the air guide holes 313, 353, finally, the compressed air is exhausted from the air outlets 315, 355. Since the width of the air guide grooves 318, 358 exceeds or equals to the gap distance between the inner surface 317 which includes the air guide grooves 318 of the guide track 30 and the slide member 10, the compressed air is exhausted from the air outlets 315, 355 first in the air guide groove 318, 358, and then to a gap in between the guide track 30 and the slide member 10 to form a uniform air cushion therebetween. The slide member 10 can, accordingly, slide in the guide track 30 stably and accurately because no compressed air accumulates adjacent to the air outlets 315, 355.

The slide member 10 is has a square cross-section, and the guide track 30 forms the rectangular guide hole 33 receiving the slide member 10, so that the slide member 10 can only move linearly and cannot rotate relative to the guide track 30. The air guide 100 can be provided with compressed air via one conduit, thus conserving size. In addition, the guide track 30 is formed by the rectangular first side plates 31 and the rectangular second side plates 35, and the first side plates 31 and the second side plates 35 all of which are easily manufactured.

It should be noted that the slide member 10 can be of other shapes, such as a equilateral triangular-shaped cross-section. In addition, the guide track 30 can also be formed by two L-shaped plates cooperatively defining a rectangular guide hole 33. The guide track 30 may include one or more than two air intakes 311.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An air guide, comprising:
a slide member; and
a guide track forming a guide hole for slidably receiving the slide member;
wherein the guide track defines at least one air intake in an outer surface, a plurality of air outlets in an inner surface opposite to the slide member, and a plurality of air guide holes therein communicating the at least one air intake with the air outlets;
wherein the guide track further defines a plurality of air guide grooves in the inner surface opposite the slide member, communicating with the air outlets, each air guide groove is substantially L-shaped, and a corner of each air guide groove is rounded; each air guide groove is defined by a flat bottom wall and two opposite sidewalls; and each sidewall connects the flat bottom wall and the inner surface via curved surface.

2. The air guide of claim 1, wherein the guide track comprises two first side plates and two second side plates; the first side plates and the second side plates cooperatively define the rectangular guide hole.

3. The air guide of claim 2, wherein the first side plates and the second side plates are fixed together via a plurality of fasteners.

4. The air guide of claim 2, wherein the number of air intakes is two, defined in the first side plates.

5. The air guide of claim 2, wherein the slide member having a substantially square cross-section.

6. The air guide of claim 1, wherein an end of each air guide hole exposed to the exterior is blocked by a sealing member.

7. The air guide of claim 1, wherein the slide member is of a hollow center.

8. An air guide, comprising:
a guide track defining a guide hole; and
a slide member slidably received in the guide hole of the guide track;
wherein the guide track defines a plurality of air guide holes therein, and a plurality of air guide grooves in an inner surface thereof opposite to the slide member, communicating with the air guide holes;
wherein a width of the air guide grooves exceeds a gap distance between the inner surface of the guide track and the slide member, each air guide groove is substantially L-shaped, and a corner of each air guide groove is rounded; each air guide groove is defined by a flat bottom wall and two opposite sidewalls; and each sidewall connects the flat bottom wall and the inner surface via curved surface.

9. The air guide of claim 8, wherein the guide track comprises two first side plates and two second side plates; and the first side plates and the second side plates cooperatively define the rectangular guide hole.

10. The air guide of claim 9, wherein the first side plates and the second side plates are fixed together via a plurality of fasteners.

11. The air guide of claim 9, wherein the slide member having a substantially square cross-section.

12. The air guide of claim 8, wherein an end of each air guide hole exposed to the exterior is blocked by a sealing member.

13. The air guide of claim 8, wherein the slide member is of a hollow center.

* * * * *